United States Patent
Liu et al.

(10) Patent No.: US 11,315,415 B2
(45) Date of Patent: Apr. 26, 2022

(54) INFORMATION SHARING SYSTEM AND INFORMATION SHARING METHOD FOR VEHICLE

(71) Applicant: InnovArt Design Inc., Brea, CA (US)

(72) Inventors: Chih-Hao Liu, Taipei (TW);
Wei-Cheng Chou, Taipei (TW);
Zong-En Yu, Yilan County (TW)

(73) Assignee: INNOVART DESIGN INC., Brea, CA (US)

( * ) Notice: Subject to any disclaimer, the term of this patent is extended or adjusted under 35 U.S.C. 154(b) by 0 days.

(21) Appl. No.: 17/020,859

(22) Filed: Sep. 15, 2020

(65) Prior Publication Data

US 2020/0410850 A1     Dec. 31, 2020

Related U.S. Application Data

(63) Continuation-in-part of application No. 16/644,156, filed as application No. PCT/US2018/049299 on Sep. 3, 2018, now abandoned.

(60) Provisional application No. 62/900,639, filed on Sep. 15, 2019, provisional application No. 62/553,855, filed on Sep. 3, 2017.

(51) Int. Cl.
  *B60Q 1/26*  (2006.01)
  *G08G 1/01*  (2006.01)
  *H04W 4/44*  (2018.01)
  *G06V 20/59*  (2022.01)

(52) U.S. Cl.
  CPC ......... *G08G 1/0141* (2013.01); *G06V 20/597* (2022.01); *G08G 1/0112* (2013.01); *G08G 1/0133* (2013.01); *H04W 4/44* (2018.02)

(58) Field of Classification Search
  CPC .. G08G 1/0141; G08G 1/0112; G08G 1/0133; H04W 4/44; G06K 9/00845
  USPC ........................................................ 340/468
  See application file for complete search history.

(56) References Cited

U.S. PATENT DOCUMENTS

| | | | |
|---|---|---|---|
| 5,835,008 A * | 11/1998 | Colemere, Jr. ........ | B60Q 1/441 340/439 |
| 5,905,434 A * | 5/1999 | Steffan ..................... | B60Q 1/50 340/464 |
| 6,300,870 B1 * | 10/2001 | Nelson ................... | B60Q 1/503 340/463 |
| 7,952,489 B1 * | 5/2011 | Paterno .................. | B60Q 1/503 340/815.4 |
| 9,947,221 B1 * | 4/2018 | Mazzola .......... | G08G 1/096716 |
| 10,096,243 B2 * | 10/2018 | Schuermeier .......... | G08G 1/162 |
| 2002/0044069 A1 * | 4/2002 | Jenkinson .............. | G08G 1/017 340/928 |
| 2004/0215464 A1 * | 10/2004 | Nelson ................ | B60R 16/0373 704/275 |

(Continued)

FOREIGN PATENT DOCUMENTS

KR     20060024485     *  3/2006

*Primary Examiner* — Kerri L McNally
*Assistant Examiner* — Thang D Tran
(74) *Attorney, Agent, or Firm* — Rabin & Berdo, P.C.

(57) ABSTRACT

The present invention provides an information sharing system for a vehicle. The information sharing system includes at least one first Internet of Things (IoT) device, for gathering information about the vehicle or a driver of the vehicle; and a second IoT device, for sharing the information; wherein the information comprises at least one of traffic-related information of the vehicle and emotion-related information of the driver.

8 Claims, 9 Drawing Sheets

(56) References Cited

U.S. PATENT DOCUMENTS

| | | | |
|---|---|---|---|
| 2009/0299857 A1* | 12/2009 | Brubaker | G06Q 30/0269 455/99 |
| 2010/0114679 A1* | 5/2010 | Pan | H02S 40/38 705/14.4 |
| 2011/0044438 A1* | 2/2011 | Wang | G10L 15/26 704/E15.005 |
| 2011/0295697 A1* | 12/2011 | Boston | B60R 13/10 705/14.68 |
| 2012/0200404 A1* | 8/2012 | Morris | G08G 1/164 340/438 |
| 2013/0154854 A1* | 6/2013 | Chen | G08G 1/164 340/905 |
| 2013/0238441 A1* | 9/2013 | Panelli | H04W 4/12 705/14.62 |
| 2014/0040016 A1* | 2/2014 | Amla | G06Q 30/0267 705/14.63 |
| 2014/0043156 A1* | 2/2014 | Howk, Jr. | B60Q 1/503 340/468 |
| 2014/0309806 A1* | 10/2014 | Ricci | G06Q 10/20 701/1 |
| 2014/0338237 A1* | 11/2014 | Chu | G09F 9/30 40/452 |
| 2015/0283939 A1* | 10/2015 | Parkes | G08G 1/052 340/468 |
| 2016/0087116 A1* | 3/2016 | Chen | H01L 27/302 257/84 |
| 2016/0283979 A1* | 9/2016 | Chatterton | H04W 4/021 |
| 2017/0104824 A1* | 4/2017 | Bajwa | H04L 65/40 |
| 2017/0200197 A1* | 7/2017 | Brubaker | G06Q 30/0241 |
| 2017/0256147 A1* | 9/2017 | Shanahan | G08G 1/096775 |
| 2017/0301283 A1* | 10/2017 | Liu | G09G 3/3233 |
| 2017/0315556 A1* | 11/2017 | Mimura | G08G 1/167 |
| 2017/0367634 A1* | 12/2017 | Wouhaybi | H04W 4/029 |
| 2017/0369055 A1* | 12/2017 | Saigusa | G08G 1/0116 |
| 2018/0053103 A1* | 2/2018 | Delgado | G06K 9/00845 |
| 2018/0090039 A1* | 3/2018 | Singireddy | G06V 10/462 |
| 2018/0151088 A1* | 5/2018 | Tan | G07C 5/008 |
| 2018/0174457 A1* | 6/2018 | Taylor | G06K 9/00302 |
| 2018/0225963 A1* | 8/2018 | Kobayashi | G08G 1/00 |
| 2019/0227310 A1* | 7/2019 | Wang | G02B 27/01 |
| 2020/0166924 A1* | 5/2020 | Pedersen | B60Q 1/50 |
| 2020/0380141 A1* | 12/2020 | Wang | H04L 9/0841 |

* cited by examiner

INFORMATION SHARING SYSTEM AND INFORMATION SHARING METHOD FOR VEHICLE

CROSS REFERENCE TO RELATED APPLICATIONS

This application claims the benefit of U.S. Provisional Application No. 62/900,639, filed on Sep. 15, 2019 and entitled "SYSTEM AND METHOD FOR SHARING INFORMATION GATHERED BY INTERNET OF THINGS DEVICES", the content of which is incorporated herein by reference, and is a continuation-in-part application of U.S. application Ser. No. 16/644,156, filed Mar. 3, 2020 (which is National Stage Entry of PCT/US2018/049299, filed Sep. 3, 2018, which claims the benefit of U.S. Provisional Application No. 62/553,855, filed Sep. 3, 2017), which is included herein by reference.

BACKGROUND OF THE INVENTION

1. Field of the Invention

The present invention relates to an information sharing system and information sharing system thereof, and more particularly, to an information sharing system and information sharing method thereof capable of sharing information gathered by Internet of Things (IoT) devices for better communication.

2. Description of the Prior Art

When driving, it is difficult for a driver to understand other drivers' thought or tendency since basic structures of vehicles for expression (e.g. car lights, car horns) are substantially identical and reveal little information about emotion-related information of the drivers inside. Therefore, conflicts may occur due to misunderstanding. Moreover, a front vehicle obscures sight of a driver of a rear vehicle, and thus the driver of the rear vehicle may not understand what happens ahead and become anxious, which may also cause misunderstanding or even danger when emergency happens.

Thus, there is a need to improve over the prior art.

SUMMARY OF THE INVENTION

It is therefore an objective of the present invention to provide an information sharing system and information sharing method thereof capable of sharing information gathered by Internet of Things (IoT) devices for better communication.

The present invention discloses an information sharing system for a vehicle. The information sharing system includes at least one first Internet of Things (IoT) device, forgathering information about the vehicle or a driver of the vehicle; and a second IoT device, for sharing the information; wherein the information comprises at least one of traffic-related information of the vehicle and emotion-related information of the driver.

The present invention further discloses an information sharing method for a vehicle. The information sharing method includes gathering information about the vehicle or a driver of the vehicle by at least one first Internet of Things (IoT) device; and sharing the information by a second IoT device; wherein the information comprises at least one of traffic-related information of the vehicle and emotion-related information of the driver.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
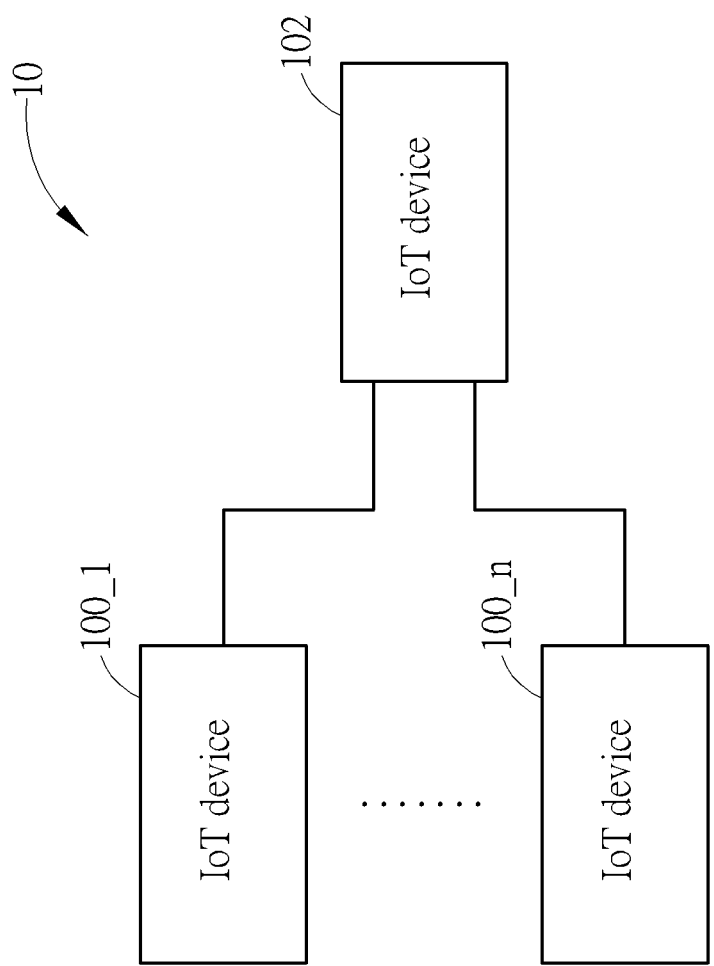
FIG. 1 is a schematic diagram of an information sharing system according to an embodiment of the present invention.

Please refer to FIG. 1, which is a schematic diagram of an information sharing system 10 according to an embodiment of the present invention. As shown in FIG. 1, the information sharing system 10 is utilized for a vehicle, and includes at least one Internet of Things (IoT) devices 100_1-100_n, and an IoT device 102. The IoT devices 100_1-100_n gather information about the vehicle or a driver of the vehicle, and then the IoT device 102 shares the information, wherein the information includes at least one of traffic-related information of the vehicle and emotion-related information of the driver.

Under such a situation, the IoT device 102 may share the information such as traffic-related information of the vehicle or emotion-related information of the driver to other drivers, other vehicles, pedestrians, and smart city infrastructure via different interaction modes for better communication than conventional car lights, car horns, etc. As a result, a status of the vehicle or the driver is better understood, thereby avoiding conflicts and building a greater driving eco-system.

Figure 2A:
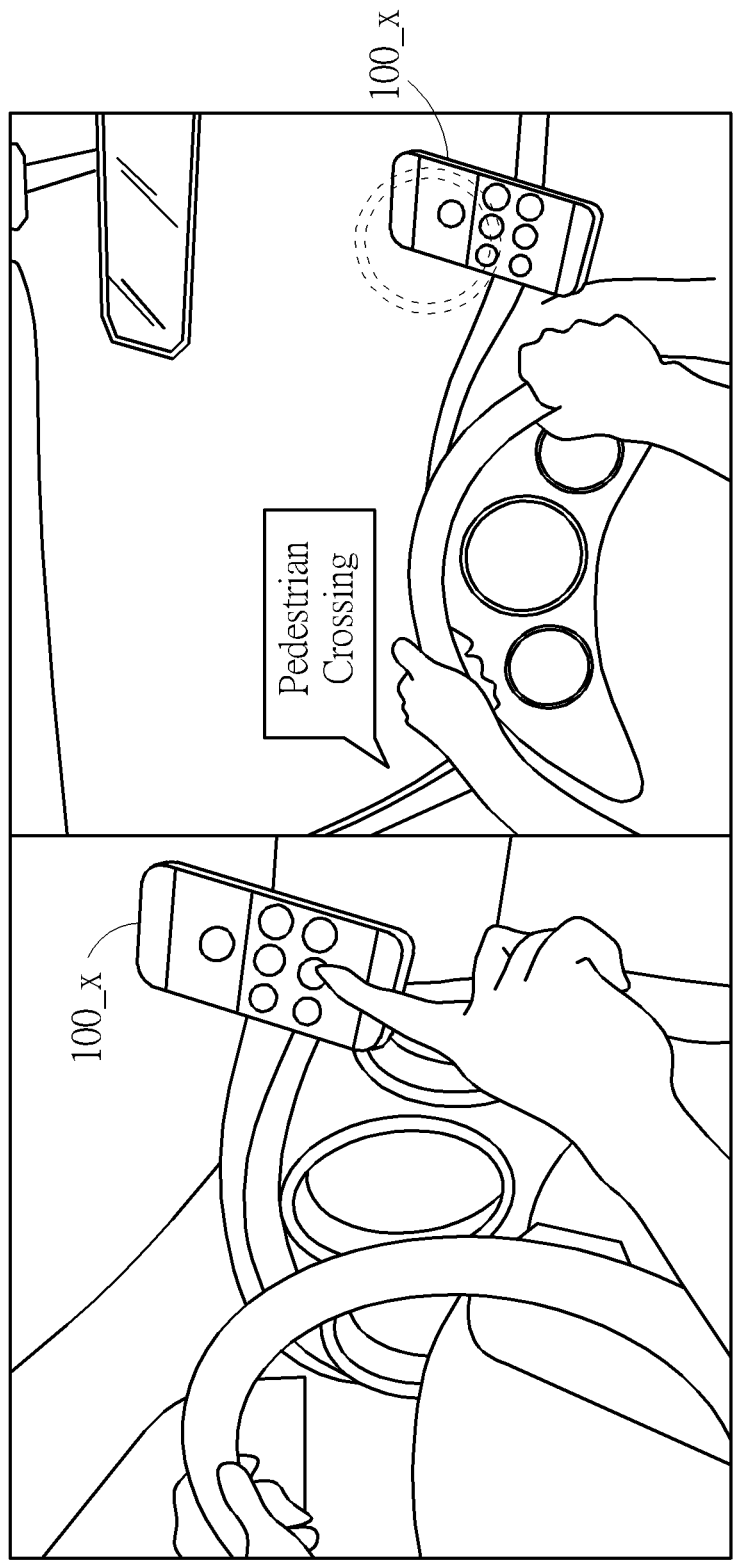
FIG. 2A is a schematic diagram of operations of an IoT devices according to an embodiment of the present invention.
Figure 2B:
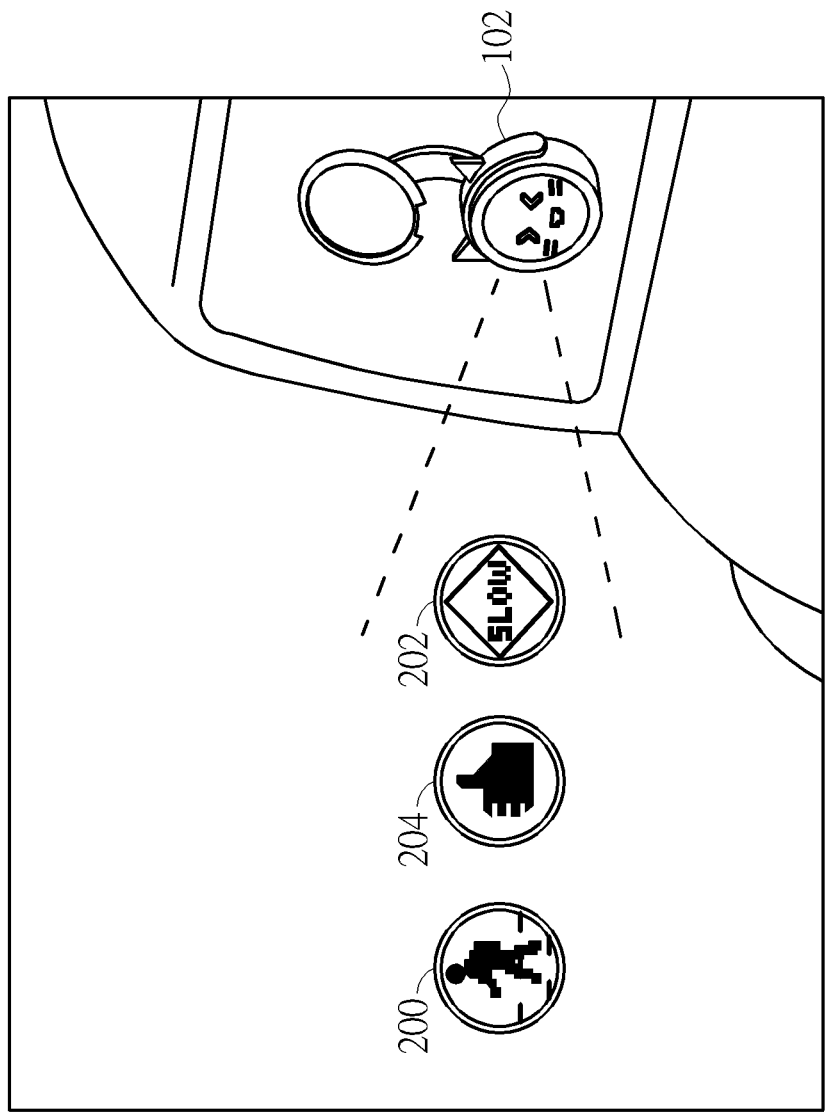
FIG. 2B is a schematic diagram of operations of an IoT device according to an embodiment of the present invention.

Specifically, please refer to FIG. 2A and FIG. 2B. FIG. 2A is a schematic diagram of operations of an IoT devices 100_x of the IoT devices 100_1-100_n according to an embodiment of the present invention, and FIG. 2B is a schematic diagram of operations of the IoT device 102 according to an embodiment of the present invention. As shown in the embodiment of FIG. 2A and FIG. 2B, since Internet of Things (IoTs) refer to interconnection of uniquely-identifiable embedded devices within the Internet infrastructure, the IoT devices 100_x may be a mobile phone installed near a dashboard, and the IoT device 102 may be a messaging display device with a machine-human interface installed on a rear windshield. The messaging display device 102 may be configured to connect with the mobile phone 100_x (or an IoT device such as a fixed or mobile controller, an edge computing unit, or a car computer) by Bluetooth or WiFi. Under such a situation, the driver may control the mobile phone 100_x by manual control (as shown in left of FIG. 2A), voice control (as shown in left of FIG. 2A), imaging or gesture recognition, such that the messaging display device 102 may correspondingly display variety of information via a display panel (e.g. emoji, message, visual message) to other drivers and pedestrians around.

Noticeably, a thin film solar panel with a specific pattern is directly overlapped on the display panel, such that the thin film solar panel could provide a certain amount of solar power to the messaging display device 102 while enhancing light transmission to allow the display panel to clearly display to share variety of information. For example, as shown in FIG. 5 of U.S. application Ser. No. 16/644,156, the specific pattern of thin film solar panel has a light transmitting portion and light emitted by the display panel can completely pass through the light transmitting portion. It is worth mentioning that the light transmitting portion can also match the number of the through holes on the display panel. Also, the area of the light transmitting portion is inversely proportional to the lightness of the display portion. Namely, the lighter the display portion, the smaller the area of the light transmitting portion.

For example, when a pedestrian is crossing and the driver stops the vehicle, a rear driver does not know what happens and gets anxious to honk the horn. The driver may manually select a "pedestrian crossing" icon (emoji) on the mobile phone 100_x or speak "pedestrian crossing" to the mobile phone 100_x after activating voice control. Afterwards, the messaging display device 102 correspondingly displays a "pedestrian crossing" icon (emoji) 200 to let the rear driver know what happens ahead so as to calm down the rear driver.

In another example, when another vehicle lets the vehicle go first. The driver may manually select a "thank you" icon (emoji) on the mobile phone 100_x or speak "thank you" to the mobile phone 100_x after activating voice control. Afterwards, the messaging display device 102 correspondingly displays a "thank you" icon (emoji) 202 to show gratitude.

On the other hand, the mobile phone 100_x may include at least one sensor for detecting a traffic status of the vehicle, to gather information for the messaging display device 102 to share. For example, the mobile phone 100_x may detect a velocity of the vehicle itself with and the vehicle behind, or the mobile phone 100_x may also detect acceleration, vibrations, and GPS location of the vehicle. Under such a situation, when the vehicle slows down, the messaging display device 102 may display a "slow down" icon (emoji) 204 to let the rear driver know.

Noticeably, the present invention is to share traffic-related information of the vehicle or emotion-related information of the driver, such that a status of the vehicle or the driver is better understood, thereby avoiding conflicts and building a greater driving eco-system. Those skilled in the art may make modifications or alterations accordingly. For example, in the above embodiment, the messaging display device 102 only shares the information gathered by another IoT device. In another embodiment, the messaging display device 102 may also be one of the IoT devices 100_1-100_n and gather the information with a sensor module for sharing. The sensor module may include a microwave sensor, an imagine recognition unit (for detecting behavior of a front vehicle), a radar to detect objects around the car, such as a pedestrian.

Furthermore, in the above embodiment, the IoT device 102 is the messaging display device 102 to share the information via a display panel to other drivers and pedestrians around. In another embodiment, the IoT device 102 may include a network connectivity module or cooperate with different network connectivity devices like gateways, mobile phone, etc. for gathering and sharing the information with a data accumulation platform such as a cloud database via a network connection. For example, the IoT device 102 itself may be a mobile phone (i.e. sharing the information via a network connection instead of a display panel); otherwise, the IoT device 102 may connect a mobile phone (e.g. the mobile phone 100_x) by Bluetooth or WiFi, and then the mobile phone transmits the information to a cloud database by 3G, 4G, 5G, or WiFi. The cloud database may include gathered data of traffic, weather, user behavior models, etc., and the IoT device 102 and other IoT devices 102 in other vehicles can share their information (with authorization) in the cloud database.

In addition, the IoT device 102 may also interact with mobile phones, edge computing devices, or car computers to gather more kinds of sensory information for facilitating the information sharing via a network connection. For example, the IoT device 102 may receive and share the information gathered by smart devices (i.e. the IoT devices 100_1-100_n) outside the vehicle via Dedicated Short Range Communication (DSRC), 4G Cellular Vehicle-to-Everything (C-V2X). The IoT device 102 may also receive the information from other IoT devices 102 in other vehicles, and provides the information from other IoT devices 102 to the driver (preferably via voice for safe driving).

As mentioned in the above, the IoT device 102 may share the information such as traffic-related information of the vehicle or emotion-related information of the driver to other drivers, other vehicles, pedestrians, and smart city infrastructure via different interaction modes, such that a status of the vehicle or the driver is better understood. The above embodiments may be categorized into four interaction modes such as V2V (Vehicle to Vehicle), (Vehicle to Network), V2I (Vehicle to Infrastructure) and V2P (Vehicle to Pedestrian) as shown in FIGS. 4A-4E, which are interaction modes according to embodiments of the present invention.

First, in the V2V (Vehicle to Vehicle) mode, the IoT device 102 obtains the information (e.g. traffic-related information of the vehicle or emotion-related information of the driver) gather by itself or the IoT devices 100_1-100_n (a car computer, a mobile phone, or an edge computing unit), and then the IoT device 102 transmits the information to the cloud database to share with other messaging display devices, car computers, or mobile phones in other vehicles. Therefore, each of the drivers of the vehicles may understand more information, which can facilitate driving safety and drivers' emotional experience.

Besides, in an embodiment, the IoT device 102 may transmit a message showing to a rear vehicle via a network connection when the vehicle is slowing down. On the other hand, the IoT device 102 may show traffic-related information or emotion-related information of the driver with an icon (emoji) to a rear vehicle via a display panel. Also, an IoT device 102 of a rear vehicle may also transmit the information to the front vehicle to communicate about traffic, emergence events, emotion, etc. Moreover, the IoT device 102 may broadcast the information to a group of drivers as a walkie-talkie. Each of drivers utilizing information sharing systems 10 in their vehicles may join a particular activity or subscribe an event as a group. A host of the group can share information about the activity to each driver of the group. Each driver of the group can feedback or share any information, e.g. location based information, to the other drivers or the host. In other embodiments, the information sharing system 10 may also be used in a platoon, advanced driving, autonomous driving, and remote driving for sharing information.

Figure 4A:
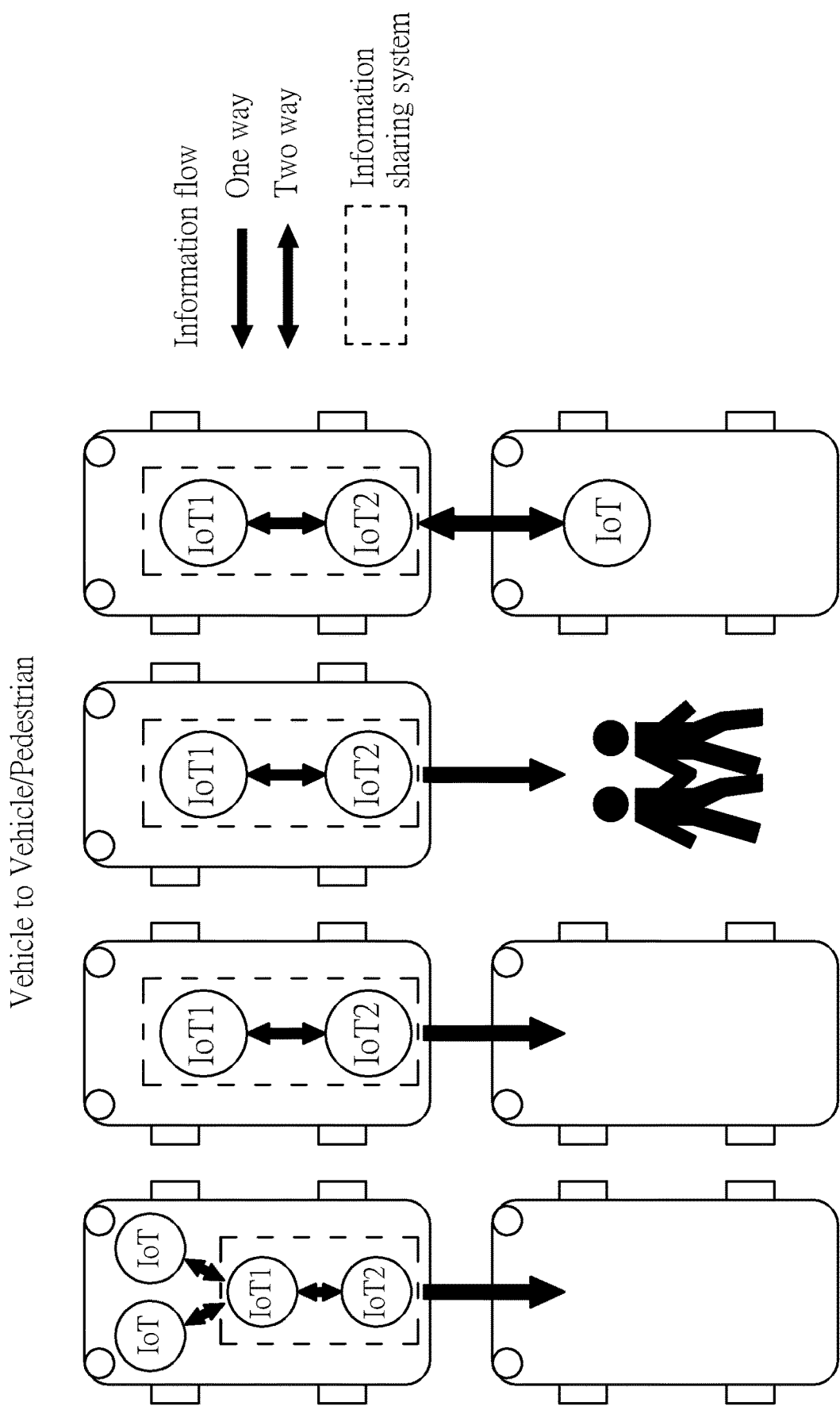
FIGS. 4A-4E, which are interaction modes according to embodiments of the present invention.

Second, in the V2P (Vehicle to Pedestrian) mode, the IoT device 102 may show traffic-related information or emotion-related information of the driver with an icon (emoji) to pedestrians around. Therefore, the present invention provides a better communication way between a driver and a pedestrian. Therefore, as shown in FIG. 4A, the IoT device 102 (e.g. IoT2) may obtains the information from an IoT device (e.g. IoT1) which obtains the information from other IoT devices or by itself to share the information with another vehicle or pedestrians in one way (via a display panel) or two way communication (with another IoT device 102 via a network connection).

Figure 4B:
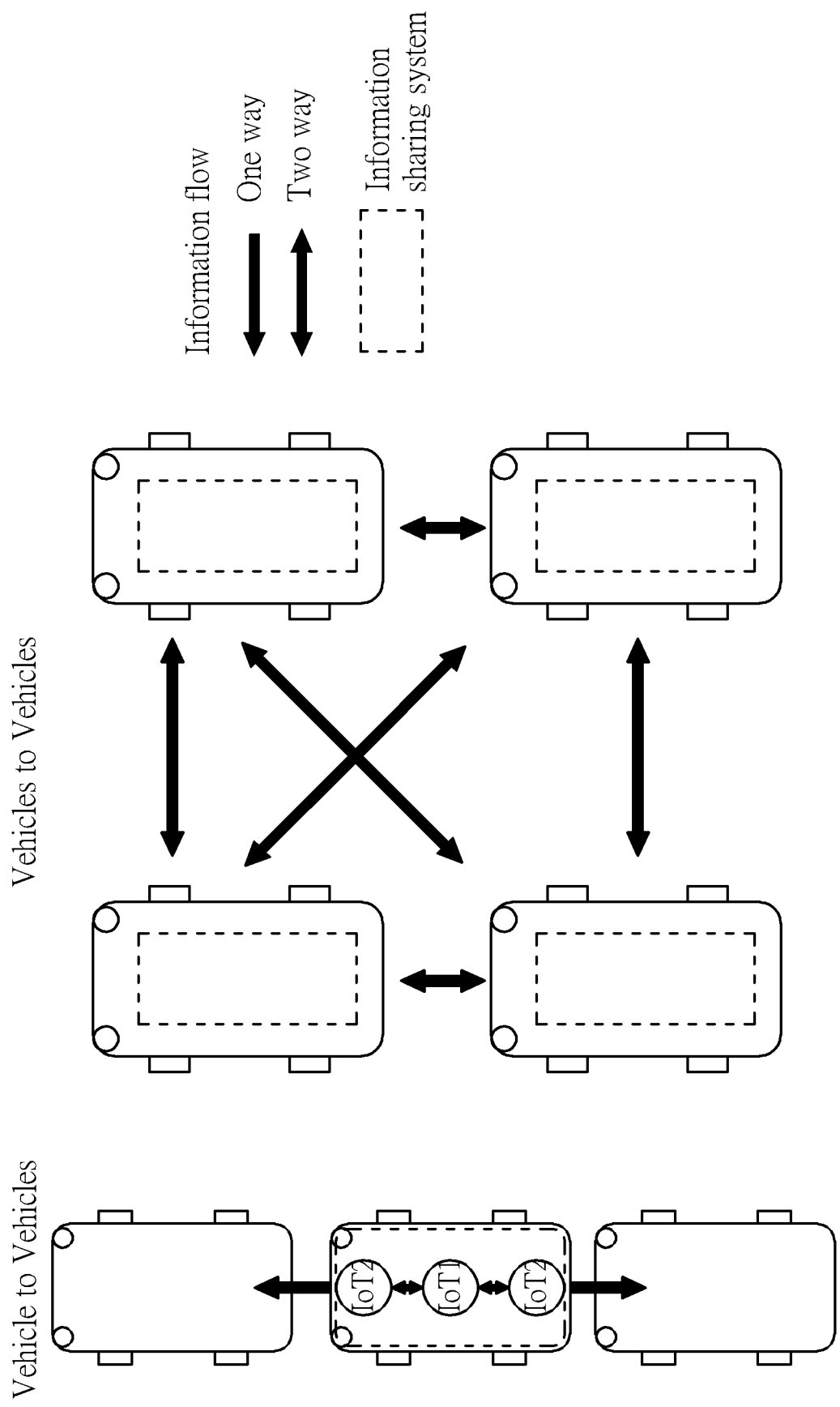

Besides, as shown in FIG. 4B, there may be two IoT devices 102 (e.g. IoT2) to share information with a front vehicle and a rear vehicle in one way communication (via a respective display panel). Also, information sharing systems 10 of different vehicles may share information with each other in two way communication (via network connection).

Figure 4C:
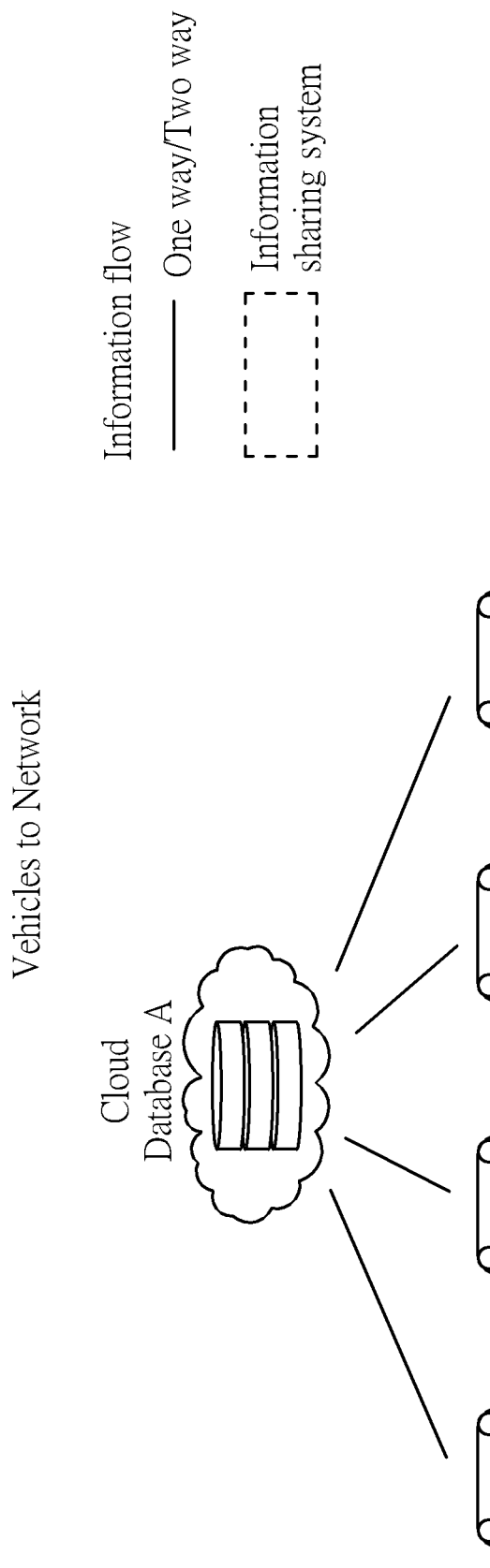
Figure 4D:
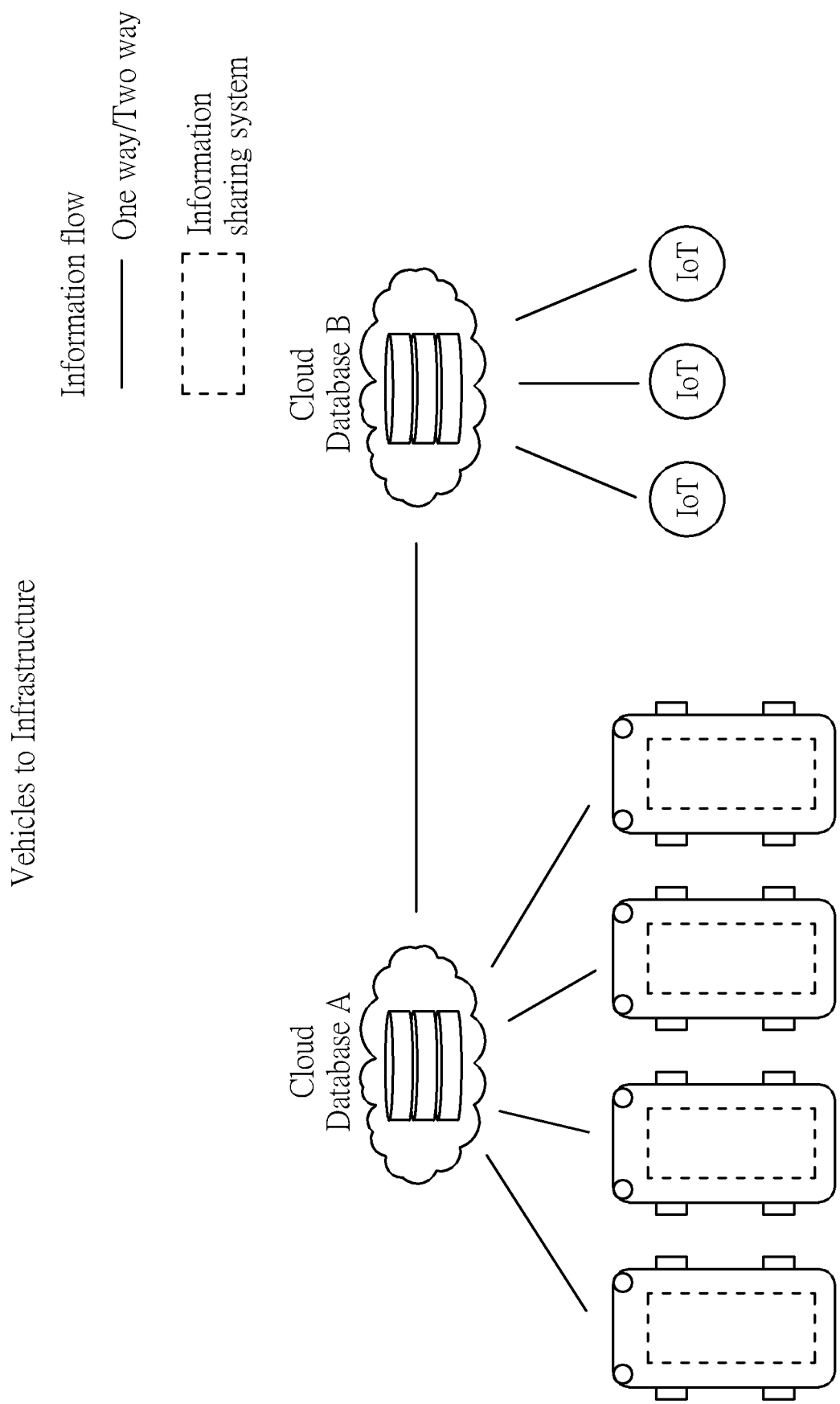
Figure 4E:
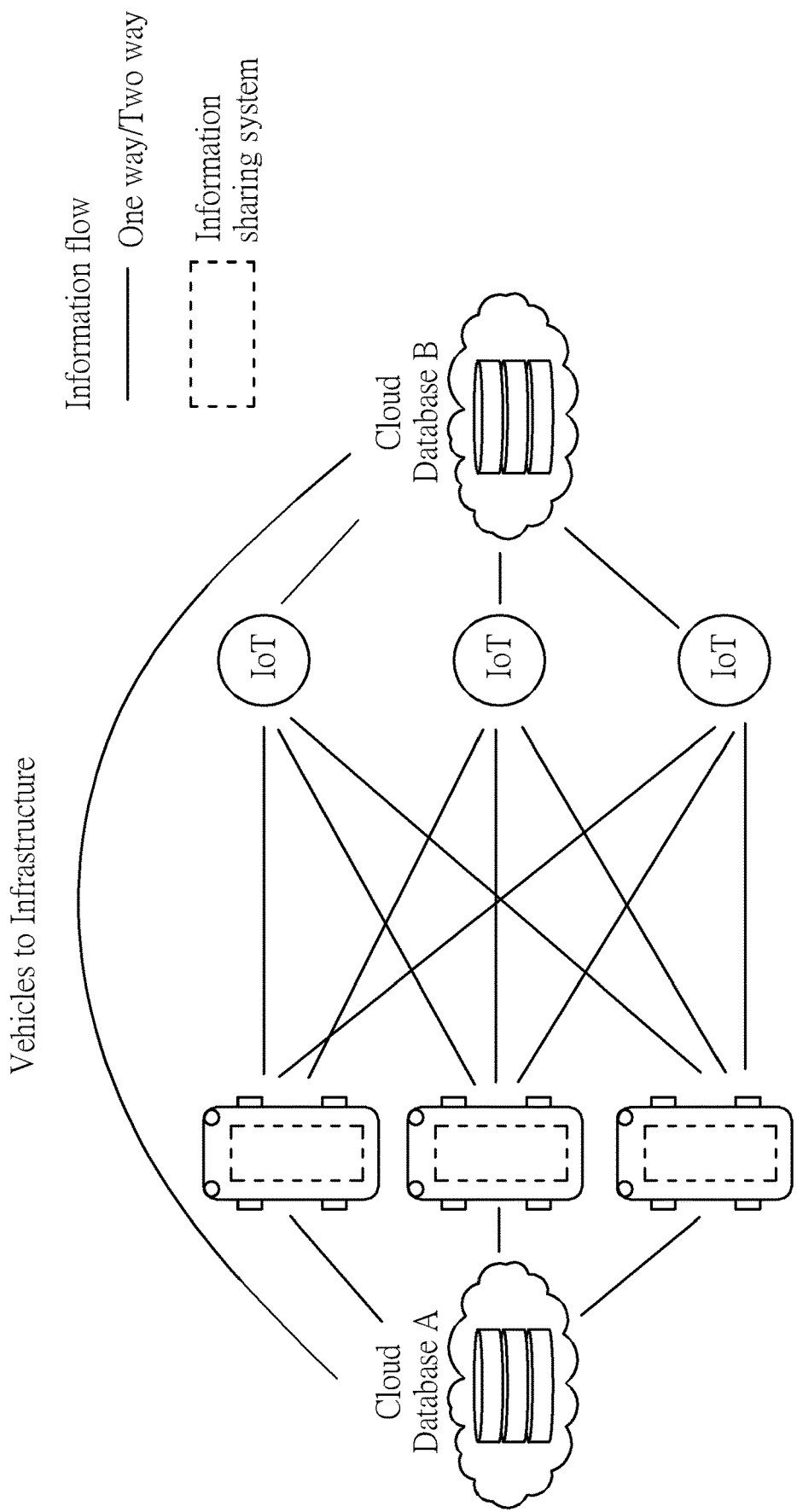

Third, in the V2N (Vehicle to Network) mode, the IoT device 102 may share and gather the information with the cloud database via a mobile phone, a Wi-Fi hotspot router, or an edge computer. Therefore, as shown in FIG. 4C, information sharing systems 10 of different vehicles may gather and share information with the cloud database in one way or two way communication (via network connection).

Fourth, in the V2I (Vehicle to Infrastructure) mode, the IoT device 102 may gather and share the information with infrastructure, wherein infrastructure includes traffic lights, intersection safety information systems, roadside units (RSU), etc. Under such a situation, the IoT device 102 may more accurately and efficiently gather traffic-related information. Therefore, the present invention may provide a safer and more enjoyable driving environment. Therefore, as shown in FIG. 4C, information sharing systems 10 of different vehicles may gather and share information with IoT devices of a cloud database by connecting with another cloud database in one way or two way communication (via network connection). Otherwise, information sharing systems 10 of different vehicles may gather and share information directly with IoT devices of a cloud database in one way or two way communication, and the cloud database may communicate with another cloud database corresponding to the information sharing systems 10 of different vehicles.

Noticeably, an IoT device may include a processor such as a microprocessor or Application Specific Integrated Circuit (ASIC), a computer readable recording medium and a communication interfacing unit. The computer readable recording medium may be any data storage device that can store program code, for access by the processor. Examples of the computer readable recording medium 310 include but are not limited to a subscriber identity module (SIM), read-only memory (ROM), flash memory, random-access memory (RAM), CD-ROMs, magnetic tape, hard disk, and optical data storage device. The communication interfacing unit is preferably a radio transceiver and can exchange wireless signals with another IoT device or the network according to processing results of the processor. The above operations of IoT devices may be compiled into the program code for each IoT device to achieve intended operations.

Figure 3:
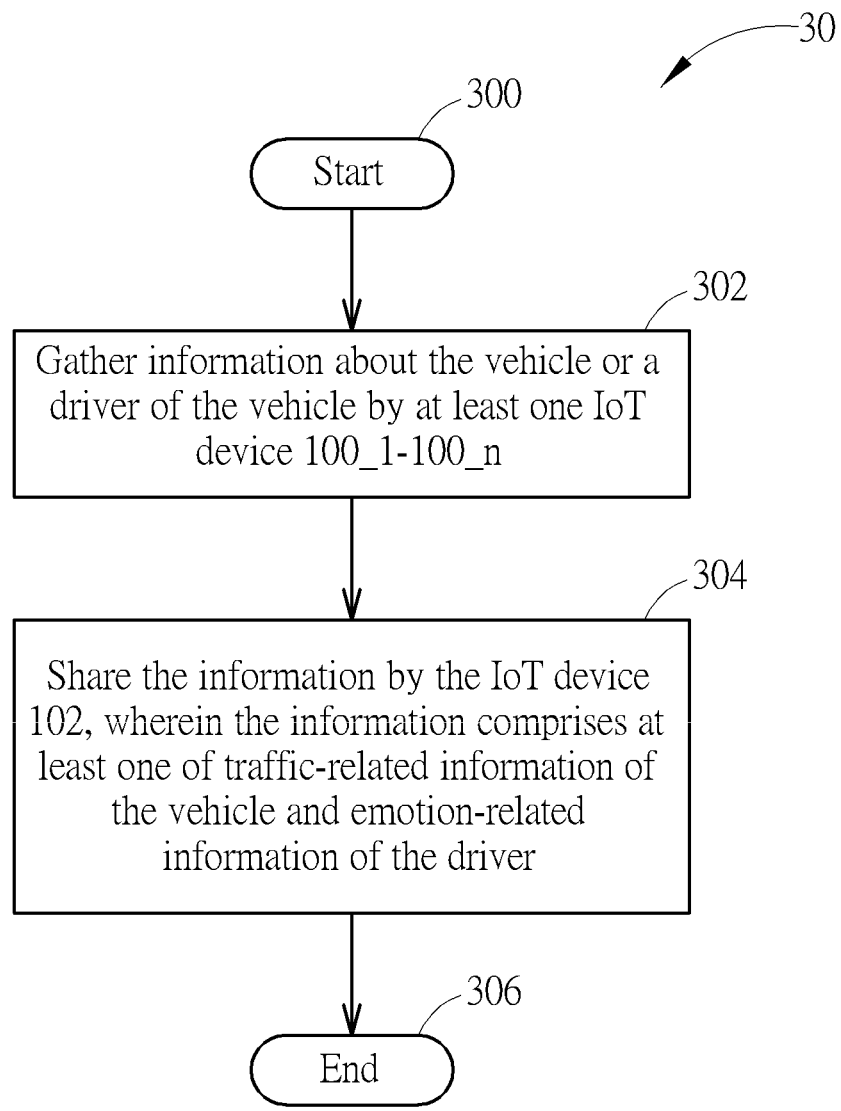
FIG. 3 illustrates a flowchart of an information sharing process according to an embodiment of the present invention.

Please refer to FIG. 3, which illustrates a flowchart of an information sharing process 30 according to an embodiment of the present invention. The above operations of the information sharing system 10 may be summarized into the information sharing process 30. The information sharing process 30 includes the following steps:

Step 300: Start.

Step 302: Gather information about the vehicle or a driver of the vehicle by at least one IoT device 100_1-100_n.

Step 304: Share the information by the IoT device 102, wherein the information comprises at least one of traffic-related information of the vehicle and emotion-related information of the driver.

Step 306: End.

Detail operations of the information sharing process 30 can be derived from the above description, and are not narrated hereinafter for brevity.

To sum up, the present invention shares traffic-related information of the vehicle or emotion-related information of the driver, such that a status of the vehicle or the driver is better understood, thereby avoiding conflicts and building a greater driving eco-system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An information sharing system for a vehicle, comprising:
   at least one first Internet of Things (IoT) device, for gathering information about the vehicle or a driver of the vehicle; and
   a second IoT device, for sharing the information;
   wherein the information comprises at least one of traffic-related information of the vehicle and emotion-related information of the driver,
   wherein the at least one first IoT device is an embedded device that connects with the second IoT device to transform the information for sharing,
   wherein the second IoT device has a display panel to display the at least one of traffic-related information of the vehicle and the emotion-related information of the driver to at least one pedestrian and another vehicle, and
   wherein the second IoT device further includes a network connectivity module, the second IoT device gathering and sharing the at least one of traffic-related information of the vehicle and the emotion-related information of the driver with a cloud database, with another second IoT device in said another vehicle, with said at least one pedestrian, and with an infrastructure via a network connection by the network connectivity module.

2. The information sharing system of claim 1, wherein the at least one first IoT device gathers the information via a manual control, a voice control, an imaging or gesture recognition control of the driver.

3. The information sharing system of claim 1, wherein a thin film solar panel with a specific pattern is directly overlapped on the display panel, and the specific pattern allows the display panel to share the information.

4. The information sharing system of claim 1, wherein the second IoT device gathers the information with a sensor module for sharing.

5. An information sharing method for a vehicle, comprising:
   gathering information about the vehicle or a driver of the vehicle by at least one first Internet of Things (IoT) device; and
   sharing the information by a second IoT device;
   wherein the information comprises at least one of traffic-related information of the vehicle and emotion-related information of the driver, wherein the at least one first IoT device is an embedded device that connects with the second IoT device to transform the information for sharing, wherein the second IoT device has a display panel to display the at least one of traffic-related information of the vehicle and the emotion-related information of the driver to at least one pedestrian and another vehicle, and wherein the second IoT device further include a network connectivity module, the second IoT device gathering and sharing the at least one of traffic-related information of the vehicle and the emotion-related information of the driver with a cloud database, with another second IoT device in said another vehicle, with said at least one pedestrian, and with an infrastructure via a network connection by the network connectivity module.

6. The information sharing method of claim 5, wherein said gathering information includes gathering the information via a manual control, a voice control, an imaging or gesture recognition control of the driver.

7. The information sharing method of claim 5, wherein a thin film solar panel with a pattern is directly overlapped on the display panel, and the pattern allows the display panel to share the information.

8. The information sharing method of claim 5, wherein the second IoT device gathers the information with a sensor module for sharing.

\* \* \* \* \*